United States Patent [19]
Wilson

[11] Patent Number: 5,129,174
[45] Date of Patent: Jul. 14, 1992

[54] FISHING LINE HOLDER

[76] Inventor: Philip H. Wilson, R.D. #2, Box 200, Campbell, N.Y. 14821

[21] Appl. No.: 728,968

[22] Filed: Jul. 12, 1991

[51] Int. Cl.⁵ .................. A01K 85/01; A01K 93/00; A01K 97/12
[52] U.S. Cl. .............................. 43/17; 43/17.2
[58] Field of Search ............. 43/17, 17.5, 17.2, 15, 43/16, 43.12

[56] References Cited

U.S. PATENT DOCUMENTS

| | | | |
|---|---|---|---|
| 1,621,017 | 3/1927 | Joyal | 43/17 |
| 2,931,122 | 4/1960 | Thordson et al. | 43/17 |
| 2,959,884 | 11/1960 | May | 43/43.12 |
| 3,199,241 | 8/1965 | Mauritz | 43/17 |
| 3,624,689 | 11/1971 | Rizzo | 43/17 |
| 3,660,923 | 5/1972 | Johnson | 43/17 |
| 3,868,668 | 2/1975 | Woodbury | 43/17 |
| 3,959,910 | 6/1976 | Montgomery | 43/17 |
| 3,992,797 | 11/1976 | Kazakevich | 43/17 |
| 4,142,316 | 3/1979 | Greer et al. | 43/17 |
| 4,541,195 | 9/1985 | Delaney | 43/17 |
| 4,586,284 | 5/1986 | Westwood | 43/17 |
| 4,696,124 | 9/1987 | Wille | 43/43.12 |

Primary Examiner—Richard K. Seidel
Assistant Examiner—Chuck Y. Mah
Attorney, Agent, or Firm—Ralph R. Barnard

[57] ABSTRACT

A device which can be placed on or removed from a fishing pole simply. It holds fishing line with the bail on reel open or closed until a fish strikes. Tension can be adjusted to control the amount of pull on the line needed to release the line. A signaling device is provided which will glow in the dark, so as to be used in daylight or dark, is released when the line is pulled loose, indicating the line is loose, and a fish has struck. The device comprises: a spring steel clip on the bottom of device which snaps around a pole for easy installation and easy removal from pole; a plastic pinching device to hold the line; an adjustment screw with nut; and a spring wire with plastic or teflon on one end to indicate a strike.

12 Claims, 7 Drawing Sheets

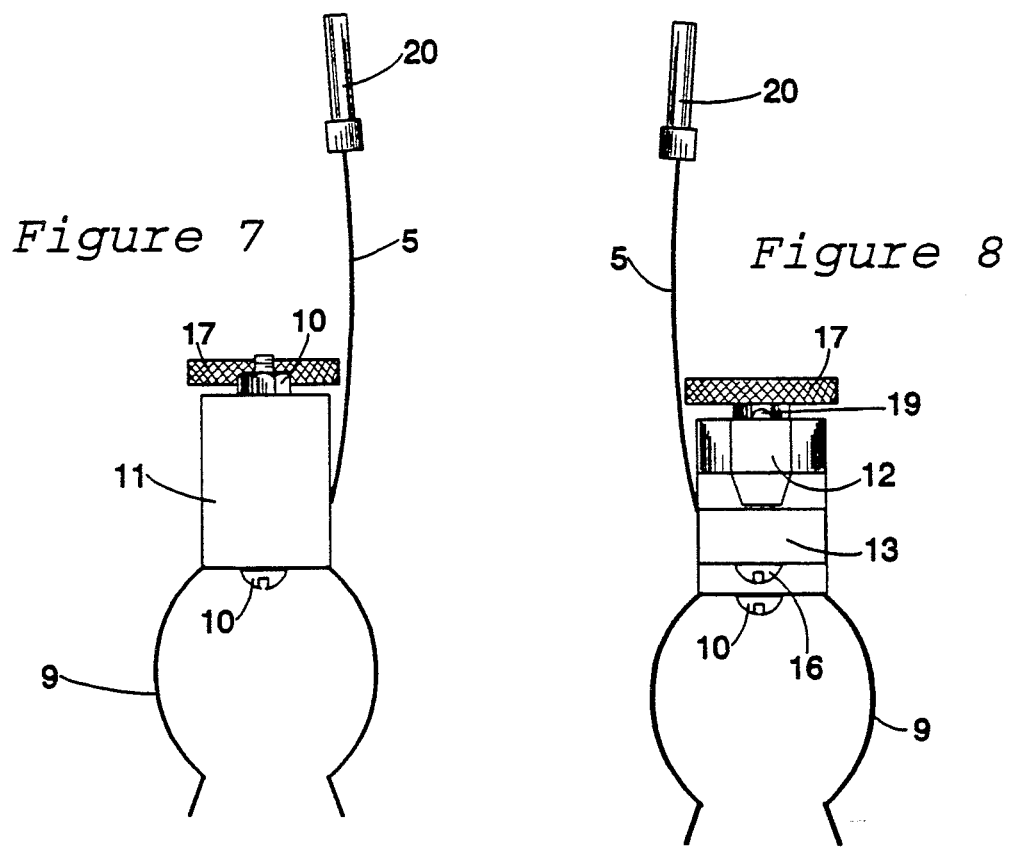
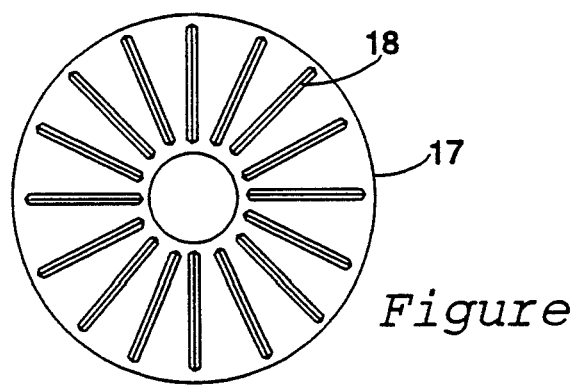

FISHING LINE HOLDER

FIELD OF THE INVENTION

The present invention relates to fishing line strike indicators and more particularly relates to fishing line strike indicators that easily install on various types and sizes of fishing rods and can be used to hold various types of fishing line and indicate when a fish strikes.

BACKGROUND OF THE INVENTION

Over the years anglers have learned that fish sometimes strike at bait and run with it before swallowing it. If a fish feels the immediate tension of the fishing line, often the fish will drop it. Therefore, anglers leave slack in the line so the fish has running room after a strike. This is done by leaving the bail open or drawing out enough line and closing the bail. Neither of these methods are particularly effective while trolling, in rough weather or when live bait is used. Sometimes anglers will place their rods on the ground or in a rod holder and place small rocks on their lines to keep excess slack from running out of reel but allowing the fish to pull the line from under the rocks and run with it. This method is extremely imprecise and is often foiled by movement of the boat or rod. Furthermore, it is difficult to see when a fish strikes and near impossible to see in the dark.

A great deal of the art of fishing is knowing when to "set the hook" after a fish strikes. It is important to know exactly when a fish strikes and to allow the fish enough time and room to run with the bait. Various devices have been provided to be used in association with fishing rods and lines to signal that a fish has struck. U.S. Pat. No. 4,541,195 teaches a line tension indicator that does not release the line at a strike but gives a signal when it senses increased tension. U.S. Pat. No. 4,142,316 teaches a fishing rod holder that includes a pressure sensitive device which generates a signal during an excessive downward pull on the line. U.S. Pat. No. 3,992,797 teaches a line tension indicator that does not release the line at a strike but gives a signal when it senses increased tension. U.S. Pat. No. 3,868,668 a line tension indicator that does not release the line at a strike but gives a signal when it senses increased tension but also generates a constant signal if a single large amount of tension is applied to the line. U.S. Pat. No. 3,624,689 teaches a line guide at the tip of a fishing rod that senses and indicates sharp contrasts in line movement or tension. In each of the foregoing patent publications the strike indicators sense increased tension in the line. Each indicator requires that the bail be closed to work properly, otherwise no change in tension will occur because more line will just be released from the reel. Furthermore, most are designed such that the line must at all times pass through some component and remain there during the entire landing procedure.

Some devices have combined means for gripping the line until a fish strikes and means for providing a signal upon the release of the line. U.S. Pat. No. 4,586,284 teaches a line indicator device where the line is held between two friction plates such that the removal of the line allows the spring to close contacts creating a signal. U.S. Pat. No. 3,959,910 teaches a line indicator device that grips the line and generates a signal as the line is removed from the grip arms.

All the strike indicators shown in the patent publications listed above are electronic devices and are subject to the problems common to all electrical devices around water. Furthermore, the additional weight of batteries may change the fundamental feel and balance of a rod such that the devices would need to be removed for more comfortable casting.

SUMMARY OF THE INVENTION

It is, therefore, a primary object of the present invention to provide a fishing line holder and strike indicator that is economical, lightweight, and water-proof.

It is a further object of the present invention to provide a fishing line holder and strike indicator that indicates the release of the fishing line by a mechanical indicator.

It is a further object of the present invention to provide a fishing line holder and strike indicator that indicates the release of the fishing line by a mechanical indicator that is luminescent so that it can be easily seen at night as well as daylight.

It is a further object of the present invention to provide a fishing line holder and strike indicator that attaches and removes from a rod easily and quickly.

It is a further object of the present invention to provide a fishing line holder and strike indicator that adjusts to put different degrees of pressure on the fishing line being held such that the force needed to release the line can be controlled.

The teachings of the present invention include the discovery that an economical, lightweight, and water-proof fishing line holder and strike indicator can be constructed with mechanical indicator. In accordance with the teachings of the present invention, a new and improved a fishing line holder and strike indicator device is provided. The device includes attaching means for temporarily securing the device to a fishing rod, a pinching device having two arms for receiving a portion of fishing line, tightening means for applying pressure to the arms such that the fishing line is held by the arms but released when a fish strike, and a mechanical strike indicator signal that indicates a strike when the line is released.

The device can be placed on or removed from a fishing rod by hand with no tools necessary and can easily be stored in tackle box. The varieties of use and combination of the line holder and the strike indicator can be used for fishing many species of fish. It holds fishing line with the bail on a reel open or closed until a fish strikes and can hold the line loose or tight. The device can be used with any size line and tension can be adjusted to control the amount of pull on the line needed to release the line. The signal device can be seen at a great distance such that an angler is free to move about the boat or fishing area to maintain more than one line at a time for more fruitful fishing. The signaling device can glow in the dark, so as to be used in daylight or dark, is released when the line is pulled loose, indicating that a fish has struck. The line holder allows the strike indicator to be used on rough days and in virtually any weather. It requires no battery or any other devices to operate so it can be submerged in water without damage.

These and other objects, features and advantages of the present invention should become apparent from the following description when taken in conjunction with the accompanying drawings.

BRIEF DESCRIPTION OF THE DRAWINGS

FIG. 7 is a back view of a fishing line holder and strike indicator taught by the present invention.

FIG. 8 is a front view of a fishing line holder and strike indicator taught by the present invention.

FIG. 11 is an underside view of a nut used to create closing pressure on the arms of a fishing line holder and strike indicator taught by the present invention showing the recessed portions.

DETAILED DESCRIPTION OF THE PREFERRED EMBODIMENT

Figure 1:
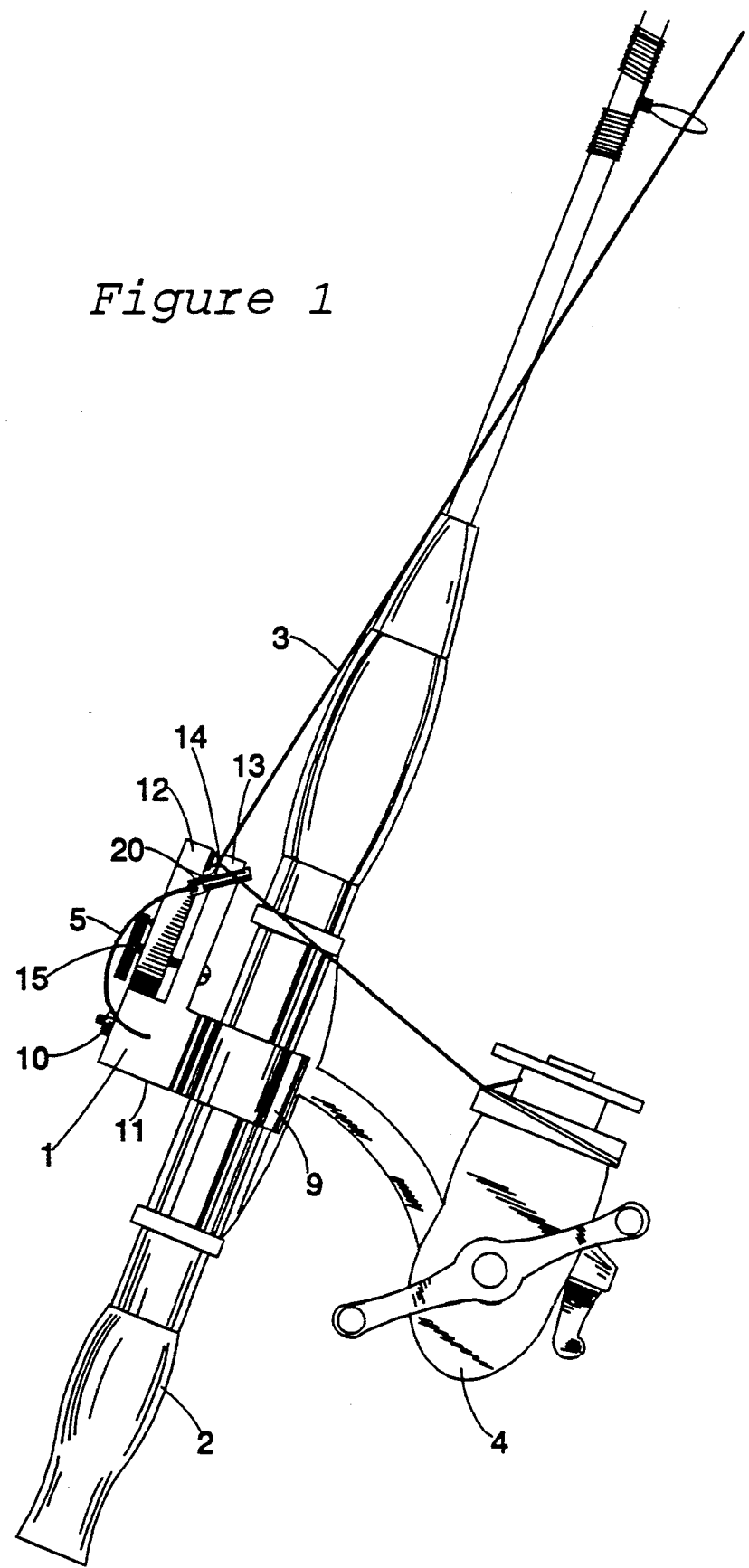
FIG. 1 is a perspective view of a fishing line holder and strike indicator taught by the present invention being used on a fishing rod with an open face reel and holding the line.

For the purposes of promoting an understanding of the teachings of the present invention, references will now be made to the embodiments illustrated in the drawings and specific language will be used to describe these embodiments. It will nevertheless be understood that no limitation of the scope of the invention is thereby intended, alterations and further applications of the teachings of the present invention as illustrated and described hereinabove is anticipated by those skilled in this art.

As can be seen in FIGS. 1-4, the line holder device 1 of the present invention clips onto the handle portion of a fishing rod 2. The angler casts or sets his/her line 3 out and depending upon the type of fishing may leave the bail open (lets line flow out if fish strikes) or close the bail (keeps the line taught when fish strikes). Once a desired amount of line 3 is released the angler pulls a short amount of line 3 from the reel 4 and sets a portion of it in the holder 1 and sets the indicator 5. The holder 1 prevents the indicator 5 from being activated by rough waves. The holder 1 also allows the angler to leave the bail open so that the fish can run with the bait before the hook is set. Once a fish does strike, the line 3 pulls out of the holder 1 by the force of the strike and the indicator 5 flips up. The indicator 5 may be luminescent for night fishing. Tension can be adjusted to control the amount of pull on the line 3 needed to release the line 3 from the holder 1.

Figure 2:
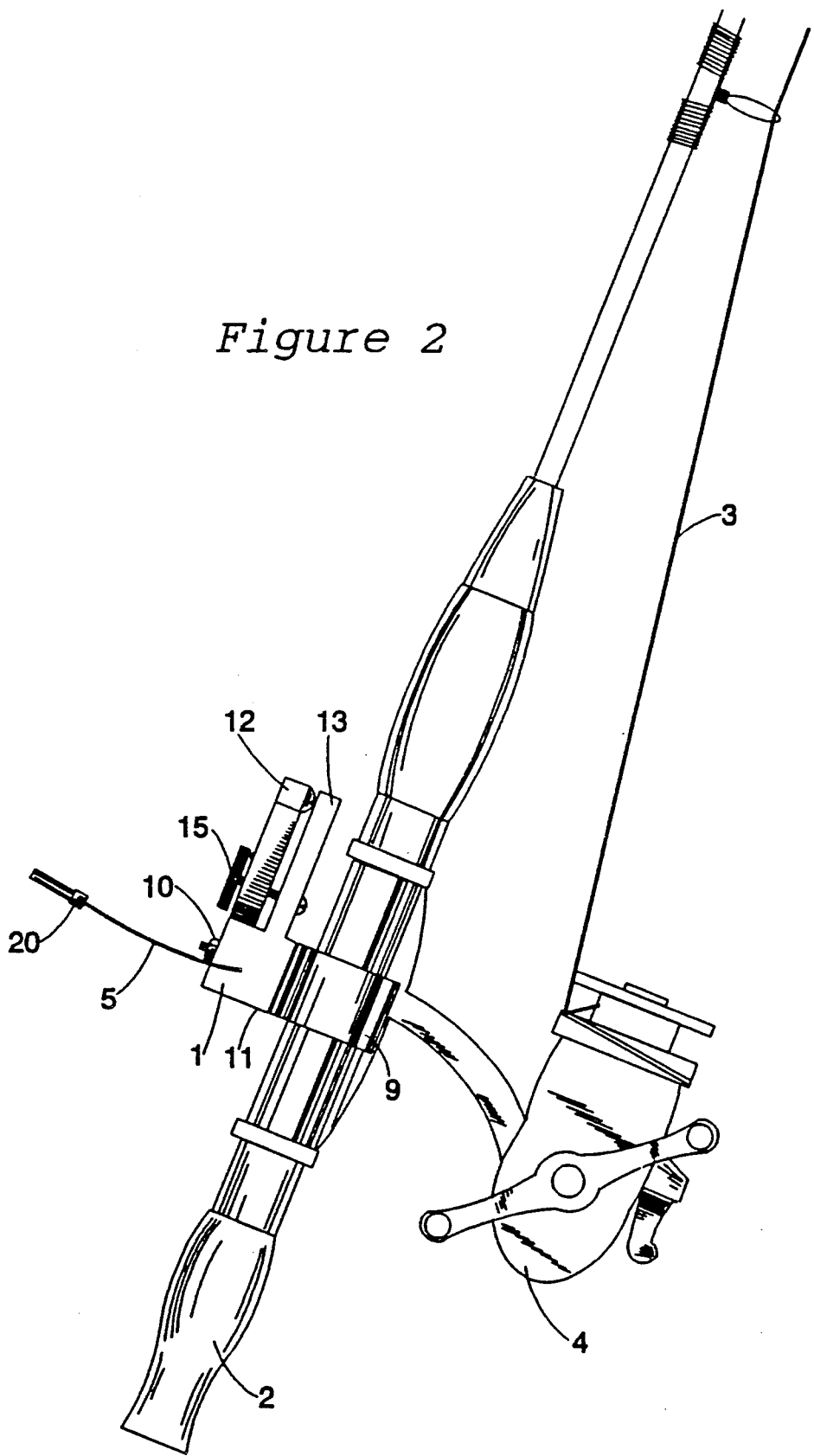
FIG. 2 is a perspective view of a fishing line holder and strike indicator taught by the present invention being used on a fishing rod with an open face reel wherein the line has been released and a strike is indicated.
Figure 3:
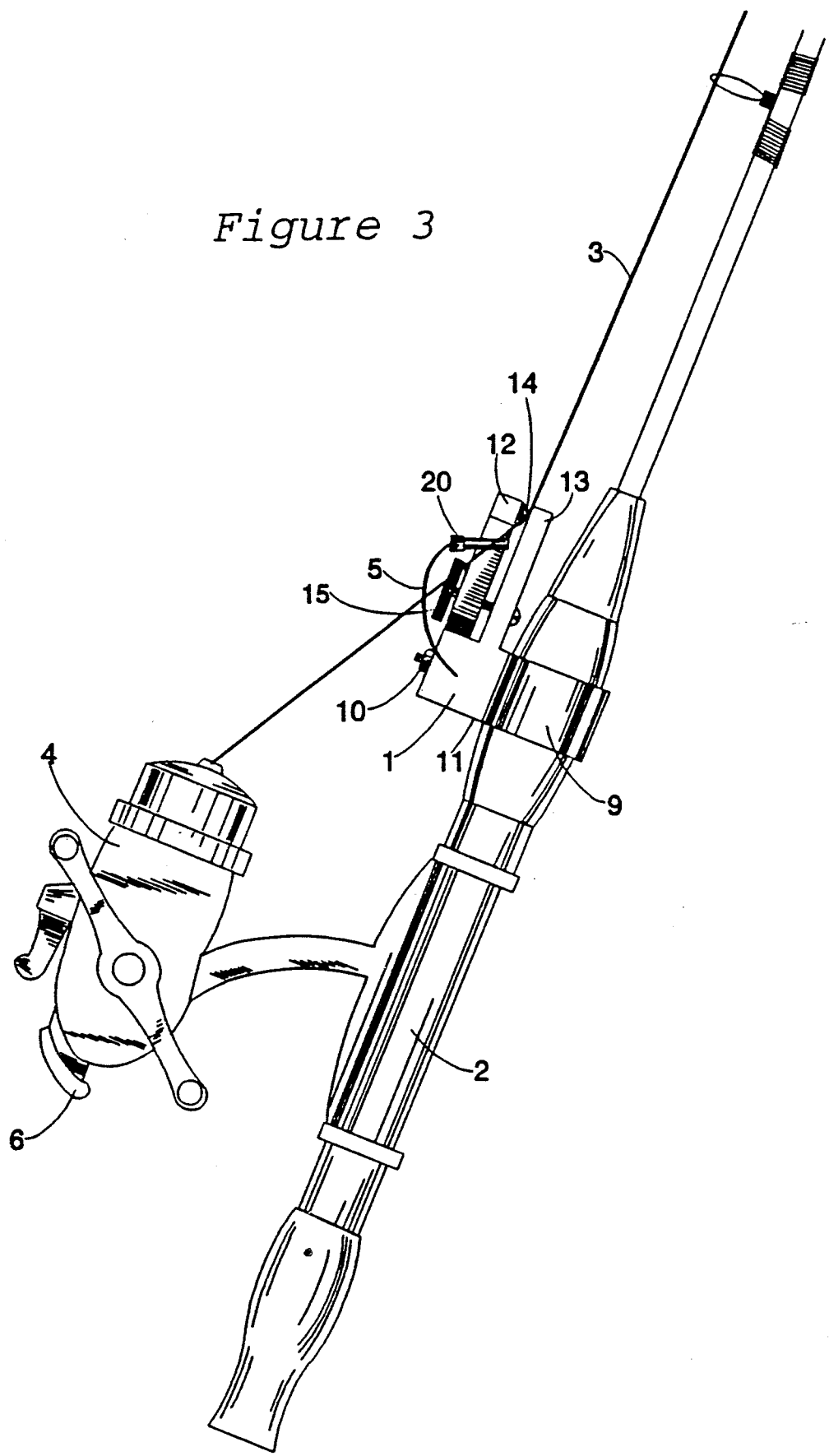
FIG. 3 is a perspective view of a fishing line holder and strike indicator taught by the present invention being used on a fishing rod with a closed face reel and holding the line.
Figure 4:
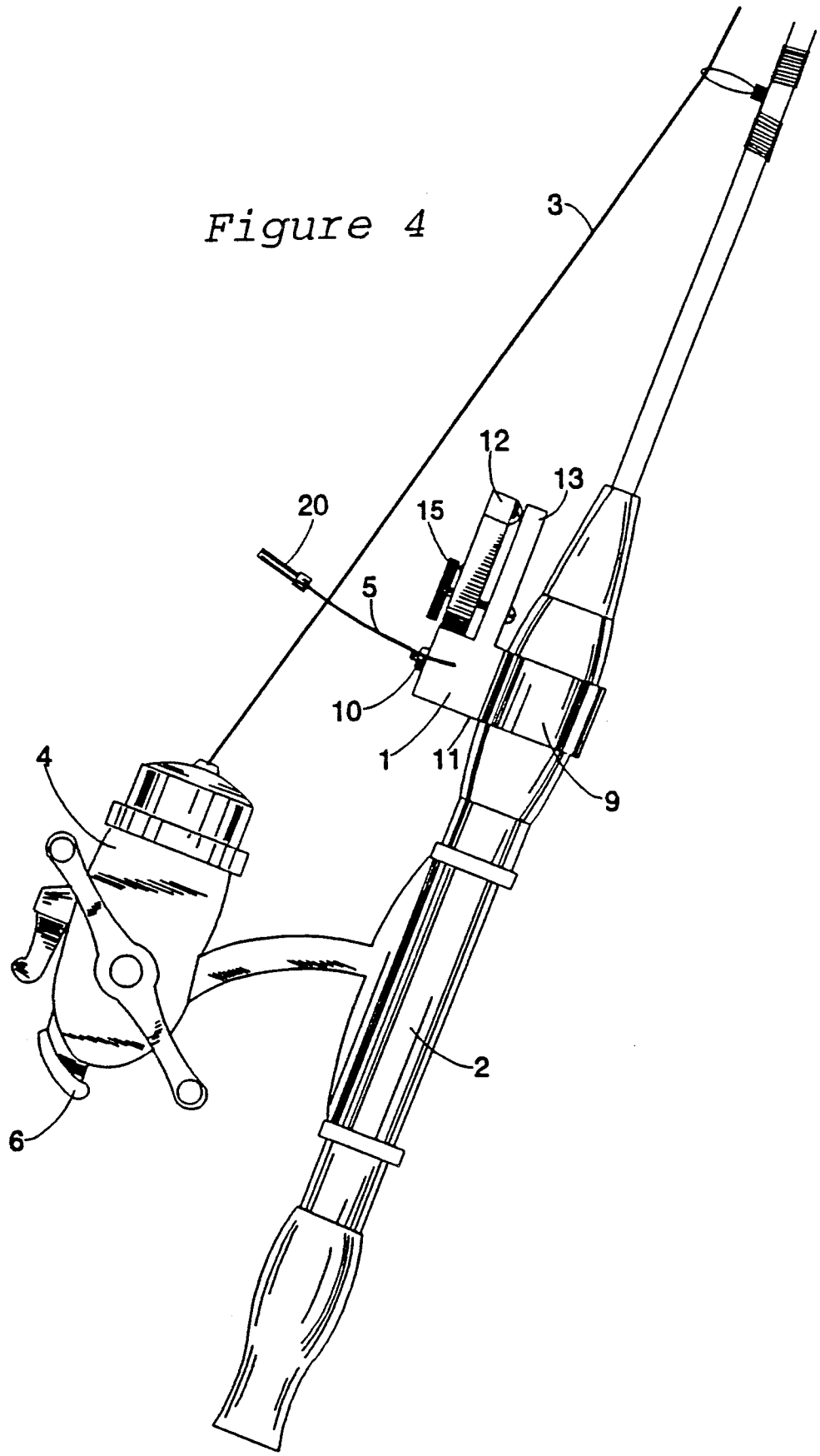
FIG. 4 is a perspective view of a fishing line holder and strike indicator taught by the present invention being used on a fishing rod with a closed face reel wherein the line has been released and a strike is indicated.
Figure 5:
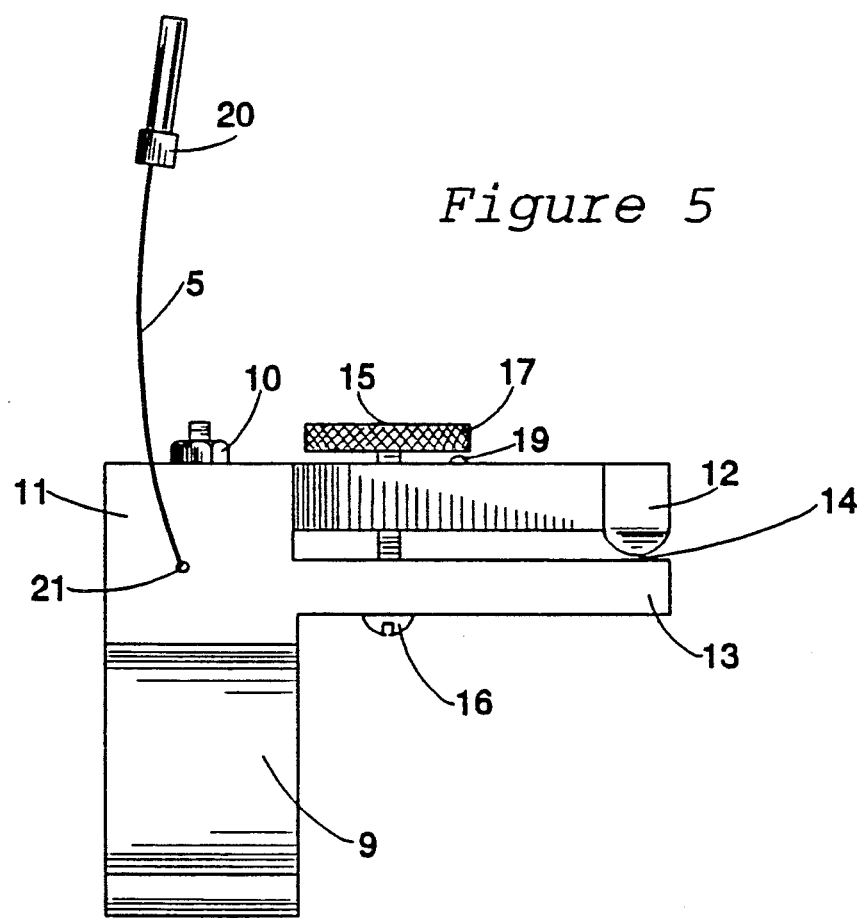
FIG. 5 is a side view of a fishing line holder and strike indicator taught by the present invention.
Figure 6:
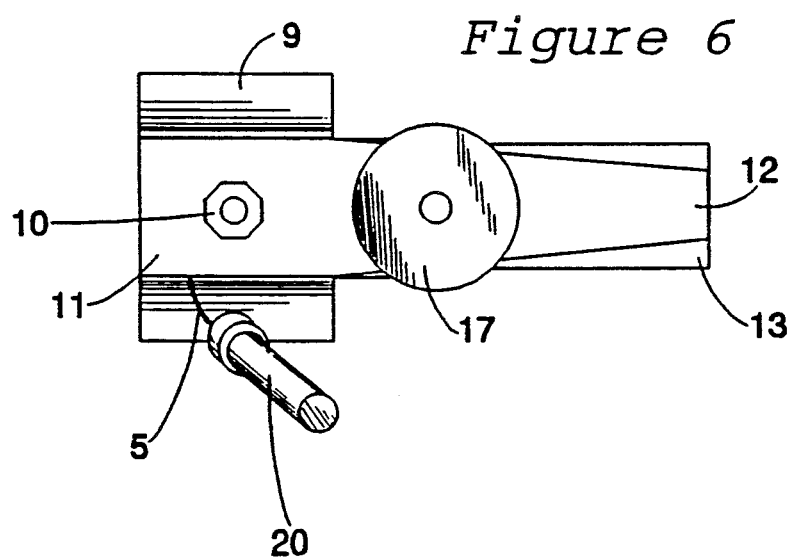
FIG. 6 is a top view of a fishing line holder and strike indicator taught by the present invention.

While the bail of the reel 4 in FIGS. 1 and 2 is shown closed, it may also be left open if desired. For the type of closed face reel 4 shown in FIGS. 3 and 4 this is done simply by pressing the bail release button 6. The slight tension between the spool of line inside the reel 4 and the line holder 1 is sufficient to prevent the indicator 5 from being activated. This tension is best achieved as is shown is FIGS. 1 and 2 by positioning the holder 1 on the fishing rod such that the angle of the line 3 coming from the reel 4 prevents the release of excess slack. If the rod 2 is placed in a rod holder then the device would be on top of the rod and therefore easier to see. The holder 1 can also be positioned as shown in FIGS. 3 and 4, however, there is the danger that the device will interfere with the casting or reeling operations. When using a closed face reel, the reel 4 is positioned on top of the rod 2 so that the device 1 would be easier to see in the position shown in FIGS. 3 and 4. Since the large market for closed face reels are children and beginning anglers, this positioning of the device 1 is particularly advantageous when a guide is supervising a group of novice anglers and needs to know the status of each person's line at a glance from anywhere on the boat. While particular equipment is shown in combination with particular positioning of the device 1, the exact positioning of the device 1 would vary depending upon the desired hand positioning for comfort and the needs of each angler.

Figure 9:
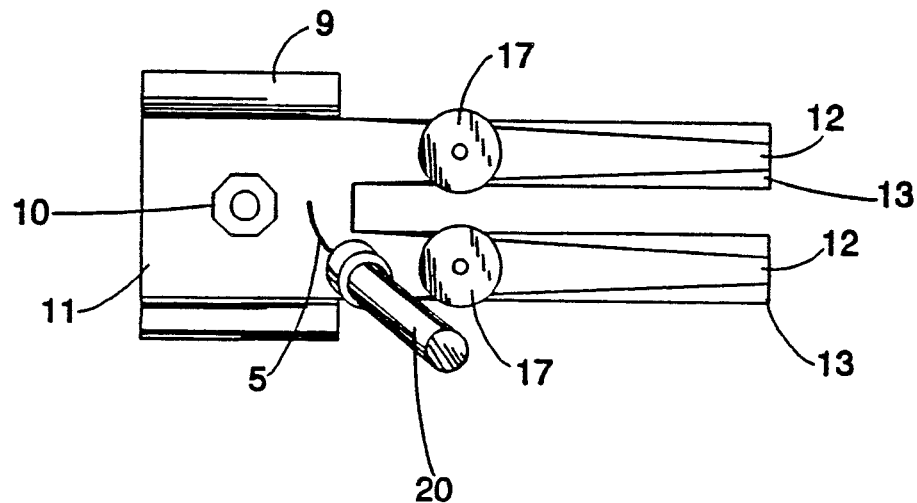
FIG. 9 is a top view of a fishing line holder and strike indicator taught by the present invention having two arm portions for holding line with the line and indicator released.
Figure 10:
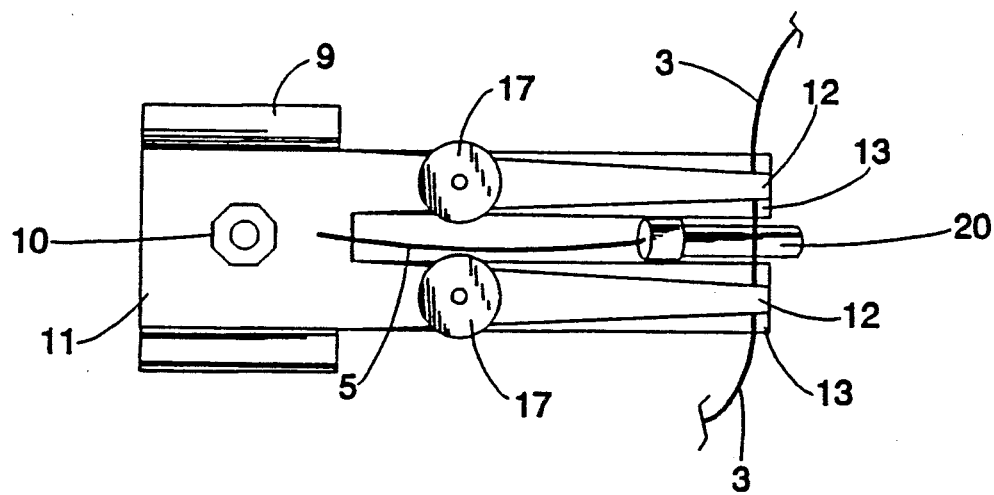
FIG. 10 is a top view of a fishing line holder and strike indicator taught by the present invention having two arm portions for holding line with the indicator set.

The device 1 of the present invention can be positioned such that it does not interfere with a casting operation or reeling operation when connected to the rod 2 because the line 3 is loose from the holder and indicator device 1 after a strike. The holder 1 can be used on windy days or calm days virtually any weather. The line 3 can be allowed to dangle loose (for bait fishing) or tight (for trolling or otherwise). When the double armed embodiment of the holder 1 shown in FIGS. 9 and 10 is used, the angler has the most freedom of use and positioning of the line 3 because the holder 1 holds the line such that it can hold down the indicator 5 but the line 3 can be loose in all other places except between the two arms. The angler could set the line 3 in the holder, draw out enough line for running room and close the bail.

The device of the present invention utilizes a mechanical strike indicator 5. As used hereinabove the term "mechanical strike indicator" means any indicator which indicates the strike condition by its relative spacial position, as opposed an electrical pulse, noise, or light. While electrical devices may have moving parts and contacts, these moving parts are not what the angler looks at to determine if a fish has struck. If the battery is dead or the device has a short circuit, the light does not light up or the alarm does not sound. The device is then useless to the angler. Any combination of electrical devices and water is a flirtation with failure of the electrical circuit and all fishing is done around water. The weight of the batteries in an electrical device is an unnecessary burden to the angler and interferes with the casting and reeling operation by upsetting the balance and weight of the rod and reel. The device 1 of the present invention performs better than the electrical devices in the patent publications listed above in that it can be used in any weather condition, is waterproof, is lightweight and can be easily removed and stored in a tackle box. The simple and efficient mechanical nature of the present invention is the greatest utility of the device 1.

The line holder device of the present invention is shown in greater detail in FIGS. 5–10. The attaching means 9 for temporarily securing the device 1 to a fishing rod 2 should be provided such that the device 1 can be fixedly secured on the rod 2 for use and can be removed from the rod 2 after use. The device 1 is connected to the attaching means 9 by a nut and bolt combination 10 such that the device 1 can be pivoted about the attaching means 9. A spring steel clip 9 can be located on the bottom of the device 1 and snap around the rod 2 for easy installation and easy removal. The function of the clip 9 could be easily simulated by a variety of attachment devices known in the art of fishing devices. The attachment means 9 allows the device 1 to be removed such that it can easily be stored in tackle box. Furthermore, the attachment means 9 could be provided such that the device 1 could be used on any type of rod 2.

The device 1 further includes a pinching device 11 connected to the attaching means 9, including two arms 12 and 13 such that the pinching device 11 can receive a portion of fishing line 3 between the arms 12 and 13. The pinching device 11 could be provided by two plastic teflon pieces or as single piece. The pinching device 11 could be constructed from a variety of materials including injection molded plastic, lightweight metals, wood etc. Plastic is the preferred material because it is much more durable in extremely wet environments. The pinching device 11 could include an extended portion 14 on one the arms 12 or 13 for more directly applying pressure and holding the line 3 such that once a fish strikes and applies a sufficient amount of pressure to draw the line 3 from between the arm 13 and the extended portion 14, the line is immediately released as opposed to being dragged through a pair of friction causing flat surfaces. Simply put, the release of the line 3 is an all or nothing condition, either the fish strike is sufficient to pull out the line 3 or it is not. The line 3 will not be worked out of the holder by rough waves or movement of the bait.

As shown in FIGS. 9 and 10, the pinching device 11 could include two sets or arms 12 and 13. The line 3 is placed between each set of arms 12 and 13 and then the indicator 5 is set under the line 3. This pair of arms 12 and 13 would prevent the indicator 5 from moving from side to side. This effectively provides two pinching devices 11 in one device 1. This allows greater flexibility for the angler in positioning the device 1 on the rod 2 and the particular method of holding the line 3.

Tightening means 15 for applying pressure to the arms 12 and 13 such that the arms 12 and 13 close on the portion of line 3 and hold the line 3 such that the line 3 is released from the arms 12 and 13 when a fish strikes. As shown, the tightening means 15 is shown as an adjustment bolt 16 with a nut 17. The tightening means 15 allows the device 1 to be adjustable for any size line 3 and be adjustable for any amount of tension on the line 3. As the nut 17 is tightened on the bolt 16 the arms 12 and 13 close on the portion of line 3 and the tension required to release the line 3 from the arms 12 and 13 can be varied by tightening or loosening the nut 17 on the bolt 16.

The nut 17 has grooves 18 on the bottom as shown in FIG. 11. A ball bearing 19 is located in the upper portion of arm 12. The grooves 18 of the nut 17 rides against the ball bearing 19 to provide clicking or locking of a nut position. This locking nut 17 and bolt 16 controls the degree of pinch desired for line 3 to pull out. As the nut 17 is turned the contact between the ball bearing surface and the grooves 18 hold the nut 17 in discrete positions of rotation but allow the nut 17 to tightened and loosened. Once the desired tension is determined, the holder can be used continuously without readjusting tightening means 15.

A mechanical strike indicator signal 5 is connected to the line holder device 1 wherein the signal 5 can be positioned in a non-strike position by bringing a portion of the signal 5 into an association with the line 3 being held between the arms 12 and 13 such that the signal 5 is held in the non-strike position (shown in FIGS. 2, 4 and 9) until the line 3 is released and the signal 5 moves to a strike position (shown in FIGS. 1, 3 and 10). The fact that the strike indicator 5 is mechanical allows the device 1 to be submerged in water without damage and requires no battery or any other devices to operate. The signal may be provided by spring wire 5 with a plastic or teflon end 20 to indicate strike.

The spring wire 5 is connected to the device 1 such that the spring wire 5 is relaxed when the spring wire 5 is in a strike position and is tense when the spring wire 5 is being held in an association with the line 3 so that when the line 3 is removed from between the arms 12 and 13, the signal moves to a relaxed position thereby indicating a strike. The strike indicator 5 may include a portion 20 that is luminescent (glow in the dark) such that the position of the strike indicator 5 can be easily seen in the dark as well as in the light. This end portion 20 can be shaped such that the relative spacial orientation of the end portion 20 to the rod 2 can be easily determined from a considerable distance during the day or at night. The thicker portion of the end portion 20 is above the narrower portion when the indicator 5 is in the non-strike position, however, the thicker portion of the end portion 20 is below the narrower portion when the indicator 5 is in the strike position. The thicker portion of the end portion 20 also prevents the line 3 from getting caught behind the end portion 20 if the rod 2 is disrupted. A portion of the spring wire 5 could be inserted into a hole 21 in the device 1 to be held or it could be inserted between two pieces forming the arms 12 and 13.

The foregoing description has been directed to particular embodiments of the invention in accordance with the requirements of the Patent Statutes for the purposes of illustration and explanation. It will be apparent, however, to those skilled in this art that many modifications and changes will be possible without departure from the scope and spirit of the invention. It is intended that the following claims be interpreted to embrace all such modifications.

I claim:

1. A fishing line holder and fish strike indicator device, comprising:
   a) attaching means for temporarily securing said device to a fishing rod such that said device can be fixedly secured on said rod for use and can be removed from said rod after use;
   b) a pinching device connected to said attaching means, including at least two arms such that said pinching device can receive a portion of fishing line between said arms;
   c) tightening means for applying pressure to said arms such that said arms close on said portion of fishing line and hold said fishing line such that said fishing line is released from said arms when a fish strikes;

d) a mechanical strike indicator signal connected to said line holder device wherein said signal can be positioned in a nonstrike position by bringing a portion of said signal into an association with said fishing line being held between said arms, and said signal is released to a strike position when said fishing line is removed from said arms.

2. The device of claim 1 wherein said mechanical strike indicator signal is a spring wire connected to said line holder device such that said spring wire is relaxed when said spring wire is in a strike position and is tense when said spring wire is being held in an association with said fishing line so that when said fishing line is removed from between said arms, said signal moves to a relaxed position thereby indicating a strike.

3. The device of claim 2 wherein said strike indicator includes a portion that is luminescent such that the position of said strike indicator can be easily seen in the dark as well as in the light.

4. The device of claim 1 wherein said attaching means is a spring clip that clips on over a portion of said rod and secures said line holder device.

5. The device of claim 1 wherein said pinching device is connected to said attaching means such that said pinching device can be pivoted about said attaching means.

6. The device of claim 1 wherein said pinching device includes an extended portion on at least one of said arms for more directly applying pressure and holding said fishing line, such that once a fish strikes and applies a sufficient amount of pressure said line is released from said arms.

7. The device of claim 1 wherein said pinching device includes two pairs of arms such that said fishing line is held between each pair of arms and said signal is between said pairs of arms when said signal is brought into an association with said fishing line in said non-strike position.

8. The device of claim 1 wherein said tightening means is a nut and a bolt through said arms such that as said nut is tightened on said bolt and said arms close on said portion of fishing line and the tension required to release said fishing line from said arms can be varied by tightening or loosening said nut on said bolt.

9. The device of claim 8 wherein said nut includes grooved portions and said pinching device includes a bearing surface under said nut such that as said nut is turned to contact said bearing surface said grooved portions hold said nut in discrete positions of rotation.

10. The device of claim 1 wherein said attaching means attaches said line holder device to said fishing rod opposing a reel.

11. A fishing line holder and fish strike indicator device, consisting of:
   a) attaching means for temporarily securing said device to a fishing rod such that said device can be fixedly secured on said rod for use and can be removed from said rod after use;
   b) a pinching device connected to said attaching means, including at least two arms such that said pinching device can receive a portion of fishing line between said arms;
   c) tightening means for applying pressure to said arms such that said arms close on said portion of fishing line and hold said fishing line such that said fishing line is released from said arms when a fish strikes;
   d) a mechanical strike indicator signal connected to said line holder device wherein said signal can be positioned in a nonstrike position by bringing a portion of said signal into an association with said fishing line being held between said arms, and said signal is released to a strike position when said fishing line is removed from said arms.

12. A fishing line holder and fish strike indicator device, consisting entirely of:
   a) a spring clip for temporarily securing said device to a fishing rod such that said device can be fixedly secured on said rod for use and can be removed from said rod after use;
   b) a pinching device connected to said attaching means, including at least two arms such that said pinching device can receive a portion of fishing line between said arms;
   c) tightening means for applying pressure to said arms such that said arms close on said portion of fishing line and hold said fishing line such that said fishing line is released from said arms when a fish strikes;
   d) a spring wire indicator signal connected to said line holder device such that said spring wire is relaxed when said spring wire is in a strike position, and said spring wire is tense when said spring wire is being held in an association with said fishing line such that when said fishing line is removed said signal moves to a relaxed position thereby indicating a strike.

* * * * *